US006535664B1

(12) United States Patent
Anderson

(10) Patent No.: US 6,535,664 B1
(45) Date of Patent: Mar. 18, 2003

(54) 1×2 OPTICAL WAVELENGTH ROUTER

(75) Inventor: Robert Anderson, Boulder, CO (US)

(73) Assignee: Network Photonics, Inc., Boulder, CO (US)

( * ) Notice: Subject to any disclaimer, the term of this patent is extended or adjusted under 35 U.S.C. 154(b) by 111 days.

(21) Appl. No.: 09/745,459

(22) Filed: Dec. 20, 2000

(51) Int. Cl.[7] .............................. G02B 6/26; G02B 6/35
(52) U.S. Cl. .............................. 385/18; 385/16; 385/17
(58) Field of Search .............................. 385/18, 17, 19, 385/10, 16, 25, 26; 359/127, 128

(56) References Cited

U.S. PATENT DOCUMENTS

| | | | | |
|---|---|---|---|---|
| 5,414,540 A | | 5/1995 | Patel et al. | 359/39 |
| 5,436,986 A | * | 7/1995 | Tsai | 385/16 |
| 5,642,446 A | * | 6/1997 | Tsai | 385/16 |
| 5,917,625 A | | 6/1999 | Ogusu et al. | 359/130 |
| 5,960,133 A | * | 9/1999 | Tomlinson | 385/18 |
| 5,999,672 A | | 12/1999 | Hunter et al. | 385/37 |
| 6,097,519 A | | 8/2000 | Ford et al. | 359/130 |
| 6,097,859 A | * | 8/2000 | Solgaard et al. | 385/17 |
| 6,108,471 A | | 8/2000 | Zhang et al. | 385/37 |
| 6,307,657 B1 | | 10/2001 | Ford | 359/130 |

OTHER PUBLICATIONS

Rallison, R.D., "Dense Wavelength Division Multiplexing (DWDM) and the Dickson Grating," White Paper, Jan. 6, 2001.

Grade, John D. et al., "A Large–Deflection Electrostatic Actuator For Optical Switching Applications," Solid–State and Actuaotr Workshop, Hilton Head Island, SC, pp. 97–100 (Jun. 2000).

Sun, et al., "Demultiplexer with 120 Channels and 0.29–nm Channel Spacing." IEEE Photonics Technology Letters, vol. 10, No. 1, Jan. 1998, pp. 90–92.

Nishi et al., "Broad–Passband–Width Optical Filter for Multi/Demultiplexer Using a Diffraction Grating and a Retroreflector Prism," Electronics Letters, vol. 21, No. 10, May 1985, pp. 423–424.

Philippe et al., "Wavelength demultiplexer: using echelette gratings on silicon substrate," Applied Optics, vol. 24, No. 7, Apr. 1985, pp. 1006–1011.

Piezo Systems, Inc. Catalog #2, 1998, pp. 1, 30–45.

Ford et al., "Wavelength Add–Drop Switching Using Tilting Micromirrors," Journal of Lightwave Technology, vol. 17, No. 5, May 1999, pp. 904–911.

* cited by examiner

*Primary Examiner*—Hung Xuan Dang
*Assistant Examiner*—M. Abutayeh
(74) *Attorney, Agent, or Firm*—Townsend and Townsend and Crew LLP

(57) ABSTRACT

A method and optical routing apparatus for directing an optical signal are disclosed. The optical routing apparatus includes an input port configured to provide the optical signal along an incident path and a plurality of output ports configured to receive the optical signal. An optical switching arrangement including a rotatable mirror and a plurality of fixed mirrors is operated to route the optical signal from the input port to one of the output ports depending on the configuration of the optical switching arrangement.

23 Claims, 3 Drawing Sheets

1×2 OPTICAL WAVELENGTH ROUTER

CROSS-REFERENCES TO RELATED APPLICATIONS

This application is being filed concurrently with related U.S. patent application Ser. Nos. 09/745,760 and 09/747,064 "BINARY SWITCH FOR AN OPTICAL WAVELENGTH ROUTER," by Robert Anderson, and "WAVELENGTH ROUTER WITH STAGGERED INPUT/OUTPUT FIBERS," by Robert Anderson and Samuel P. Weaver, both of which are herein incorporated by reference in their entirety for all purposes.

BACKGROUND OF THE INVENTION

This application relates generally to fiber-optic communications and more specifically to techniques and devices for routing optical signals to different output ports (or, conversely, routing different spectral bands at the output ports to the input port).

The Internet and data communications are causing an explosion in the global demand for bandwidth. Fiber optic telecommunications systems are currently deploying a relatively new technology called dense wavelength division multiplexing (DWDM) to expand the capacity of new and existing optical fiber systems to help satisfy this demand. In DWDM, multiple wavelengths of light simultaneously transport information through a single optical fiber. Each wavelength operates as an individual channel carrying a stream of data. The carrying capacity of a fiber is multiplied by the number of DWDM channels used. Today DWDM systems employing up to 80 channels are available from multiple manufacturers, with more promised in the future.

In all telecommunication networks, there is the need to connect individual channels (or circuits) to individual destination points, such as an end customer or to another network. Systems that perform these functions are called cross-connects. Additionally, there is the need to add or drop particular channels at an intermediate point. Systems that perform these functions are called add-drop multiplexers (ADMs). All of these networking functions are currently performed by electronics—typically an electronic SONET/SDH system. However SONET/SDH systems are designed to process only a single optical channel. Multi-wavelength systems would require multiple SONET/SDH systems operating in parallel to process the many optical channels. This makes it difficult and expensive to scale DWDM networks using SONET/SDH technology.

The alternative is an all-optical network. Optical networks designed to operate at the wavelength level are commonly called "wavelength routing networks" or "optical transport networks" (OTN). In a wavelength routing network, the individual wavelengths in a DWDM fiber must be manageable. New types of photonic network elements operating at the wavelength level are required to perform the cross-connect, ADM and other network switching functions. Two of the primary functions are optical add-drop multiplexers (OADM) and wavelength-selective cross-connects (WSXC).

In order to perform wavelength routing functions optically today, the light stream must first be de-multiplexed or filtered into its many individual wavelengths, each on an individual optical fiber. Then each individual wavelength must be directed toward its target fiber using a large array of optical switches commonly called an optical cross-connect (OXC). Finally, all of the wavelengths must be re-multiplexed before continuing on through the destination fiber. This compound process is complex, very expensive, decreases system reliability and complicates system management. The OXC in particular is a technical challenge. A typical 40–80 channel DWDM system will require thousands of switches to fully cross-connect all the wavelengths. Opto-mechanical switches, which offer acceptable optical specifications, are too big, expensive and unreliable for widespread deployment. New integrated solid-state technologies based on new materials are being researched, but are still far from commercial application.

Consequently, the industry is aggressively searching for an all-optical wavelength routing solution that enables cost-effective and reliable implementation of high-wavelength-count systems.

SUMMARY OF THE INVENTION

Embodiments of the invention are directed to a method and optical routing apparatus for directing an optical signal. The optical routing apparatus includes an input port configured to provide the optical signal along an incident path and a plurality of output ports configured to receive the optical signal. An optical switching arrangement is operated to route the optical signal from the input port to one of the output ports depending on the configuration of the optical switching arrangement.

The optical switching arrangement includes a plurality of fixed mirrors, each of which is positioned with respect to the incident path of the optical signal at a particular angle. Each fixed mirror is associated with one of the output ports. The optical switching arrangement also includes a rotatable mirror configured to rotate to a plurality of distinct positions that define the different configurations of the optical switching arrangement. In each of those positions, the rotatable mirror defines an approximately right included angle with a particular fixed mirror. The optical path defined by that position includes a reflection of the rotatable mirror and off that particular fixed mirror.

In various embodiments, the lengths of the optical paths from the input port to the output ports are of approximately the same length. In another embodiment, the fixed mirrors are positioned specifically to achieve equalization of path length. The size of the fixed mirrors may vary to account for dispersion of the optical signal off the rotatable mirror, with each fixed mirror having a spatial extent proportional to its distance from the rotatable mirror. In particular embodiments, the number of output ports and fixed mirrors is two, thereby defining a 1×2 optical switch. In some such embodiments, the included angles defined by the rotatable mirror and the two fixed mirrors are complementary.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components.

DESCRIPTION OF THE SPECIFIC EMBODIMENTS

I. Introduction

The following description sets forth embodiments of an optical switch for use in an optical wavelength router according to the invention. Embodiments of the invention can be applied to network elements such as optical add-drop multiplexers (OADMs) and wavelength-selective cross-connects (WSXCs), among others, to achieve the goals of optical networking systems.

The general functionality of one optical wavelength router that can be used with the embodiments of the invention is described in detail in the copending, commonly assigned United States Patent Application, filed Nov. 16, 1999 and assigned Ser. No. 09/442,061, entitled "Wavelength Router," which is herein incorporated by reference in its entirety, including the Appendix, for all purposes. As described therein, such an optical wavelength router accepts light having a plurality of spectral bands at an input port and selectively directs subsets of the spectral bands to desired ones of a plurality of output ports. As used herein, the terms "input port" and "output port" are intended to have broad meanings. At the broadest, a port is defined by a point where light enters or leaves the optical router. For example, the input (or output) port could be the location of a light source (or detector) or the location of the downstream end of an input fiber (or the upstream end of an output fiber).

II. 1×2 Switch

Embodiments of the invention are described below for a form of optical switch referred to herein as a "1×2 switch." Appropriate modifications will be apparent to those of skill in the art upon reading such description. The 1×2 switch may be used as a retroreflector such that in one configuration it reflects a signal from an input port to a first output port and in a second configuration reflects a signal from the input port to a second output port. Exemplary uses for such a 1×2 switch are described in U.S. patent application Ser. No. 09/442,061, in which retroreflectors are used to direct optical signals within a wavelength router.

Figure 1:
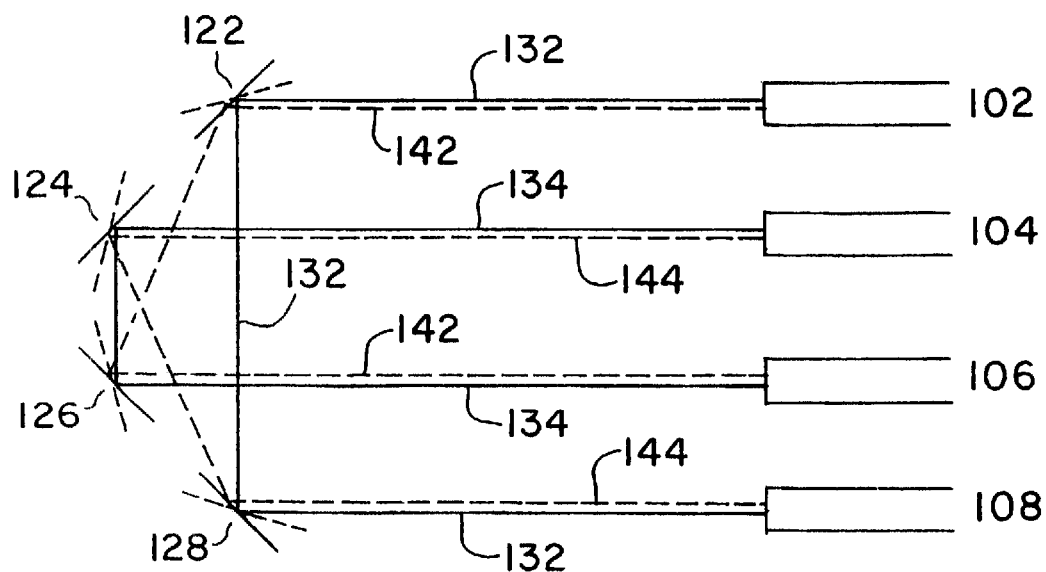
FIG. 1 illustrates schematically how a 2×2 optical switch that uses four rotatable MEMS micromirrors may be used as a retroreflector.

A 2×2 switch such as shown in FIG. 1 (see also FIGS. 5B and 5D of U.S. patent application Ser. No. 09/442,061) may be used as a retroreflector. The 2×2 switch configuration shown in FIG. 1 is implemented with four rotatable microelectromechanical system ("MEMS") micromirrors. Because the optical signal is demultiplexed into multiple wavelength components, each MEMS micromirror shown in the illustrated configurations may thus denote an array of MEMS micromirrors for acting on each of these individual wavelength components.

Use of the 2×2 switch to retroreflect an optical signal from input port 102, for example, may be achieved where MEMS mirror 126 is in the dotted position and MEMS mirror 128 is in the solid position. In this configuration, the optical signal from input port 102 is reflected off MEMS mirror 122 and follows either path 132 or path 142 to output port 108 or 106 respectively, depending on whether MEMS mirror 122 is in the solid or dashed position. The MEMS mirrors may also be configured to retroreflect an optical signal from input port 104. In this case, MEMS mirror 126 is in the solid position and MEMS mirror 128 is in the dashed position. Accordingly, the optical signal from input port 104 is reflected off MEMS mirror 124, following path 134 or 144 to output port 106 or 108 respectively, depending on whether MEMS mirror 124 is in the solid or dashed position.

Figure 2:
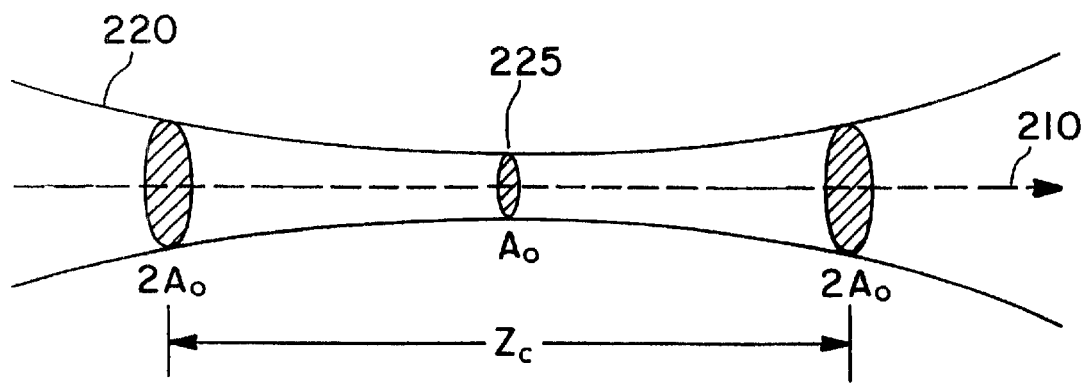
FIG. 2 shows the beam shape of an optical signal, illustrating that the beam is narrowest in the confocal region of the beam.

The use of multiple micromirrors increases the electromechanical complexity of the switch and limits the potential bandwidth. The effect on bandwidth can be understood by recognizing that the optical beam, rather than propagating with a point cross-section, has a characteristic narrowing shape. This shape is illustrated in FIG. 2, where the beam 220 is propagating along axis 210. The narrow portion of the beam 225 is referred to as the "beam waist." The length of the beam waist is defined by the confocal length $z_c$ of the beam, which is a measure of the distance along the propagation axis 210 over which the area of the beam first narrows from twice the beam waist 225 size and the expands back to twice its size at the beam waist 225, i.e. from $2A_0$ to $A_0$ to $2A_0$.

Bandwidth is related to the movement of each of the wavelength components of the optical signal along a mirror as the signal is modulated. For example, if a particular wavelength component has a spot size of 11 μm at the focal point and each MEMS micromirror has a diameter of 50 μm, the available bandwidth is restricted because the modulation cannot be so great that the spot strikes an unintended nearby mirror. When there is more than a single MEMS array, it is impossible to position all of the MEMS arrays at the focal points for all individual wavelength components because of the characteristic beam shape. Accordingly the spot size on the same size mirror is larger, restricting the possible beam modulation even further. Maximal bandpath is thus available where the micromirrors are positioned in the confocal zone, and if the spot size is as great as the mirror diameter (i.e. ≧50 μm in the example), then the available bandwidth is zero. Accordingly, optical signal bandwidth can generally be improved with embodiments in which the number of MEMS micromirror arrays is limited.

Figure 3:
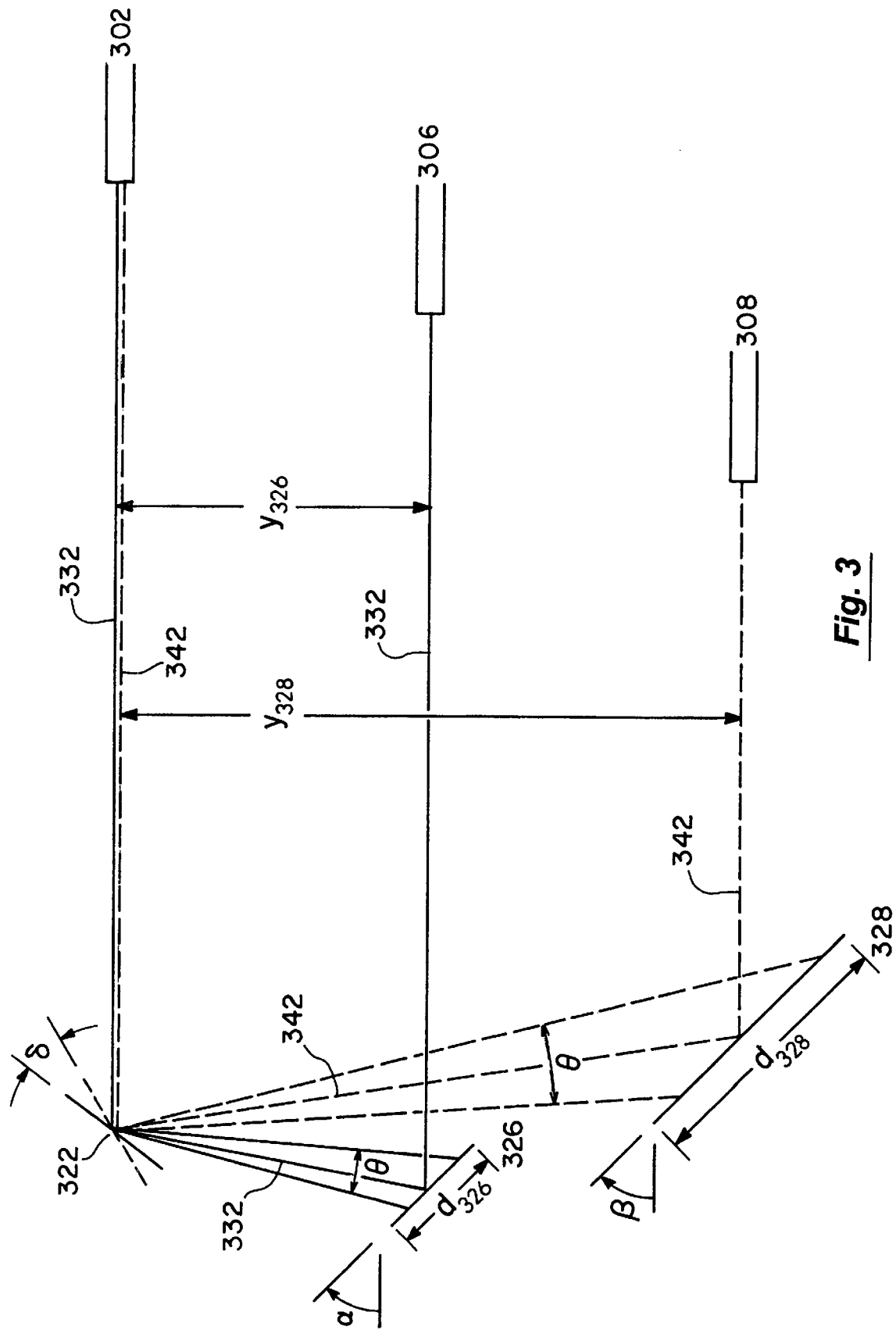
FIG. 3 illustrates schematically a 1×2 optical switch that uses only a single rotatable MEMS micromirror in accordance with the present invention.

Thus, embodiments of the invention shown in FIG. 3 permit retroreflection with a single rotatable MEMS micromirror 322. As shown in the figure, the optical arrangement can be used to retroreflect an optical signal from input port 302 to either of output ports 306 or 308 depending on the configuration of the rotatable MEMS micromirror 322. The optical arrangement includes fixed mirror 326, which is inclined at angle α, and fixed mirror 328, which is inclined at angle β. When MEMS micromirror 322 is in a first (DASHED) position, the optical signal from input port 302 is reflected off MEMS micromirror 322 and fixed mirror 326 to be directed along path 332 to output port 306. In this configuration, MEMS micromirror 322 and fixed mirror 326 define a right included angle. When MEMS micromirror 322 is instead rotated by angle δ (=α−β) to a second (SOLID) position, the optical signal is reflected off MEMS micromirror 322 and fixed mirror 328 to be directed along optical path 342 to output port 308. In this configuration, MEMS micromirror 322 and fixed mirror 328 define a right included angle. This optical arrangement differs from FIG. 5A of U.S. patent application Ser. No. 09/442,061, which instead shows a retroreflector embodiment that uses a macroscopic rotatable mirror, requiring larger beam displacement than with the present invention.

Embodiments of the invention make use of an optical-lever arrangement in which the signal reflected off MEMS mirror 322 is increasingly dispersed as it propagates to one of the fixed mirrors 326 or 328. As illustrated, the reflected signal has a dispersive angle θ such that the spot size reaching fixed mirror 328 is larger than the spot size reaching fixed mirror 326. Accordingly, in certain embodiments of the invention the size $d_{328}$ of fixed mirror 328 is larger than the size $d_{326}$ of fixed mirror 326. In the specific embodiment illustrated in FIG. 3, the fibers are spaced approximately equidistantly, i.e. $y_{328}=2y_{326}$, so that the fixed mirror sizes are in the same proportion, $d_{328}=2d_{326}$. For typical telecommunications fiber-optics arrangements, in which the individual polymer-coated fibers have a diameter of 250 µm, the uniform port spacing may be equal to the fiber diameter ($Y_{326}$=250 µm and $y_{328}$=500 µm). In such an embodiment, with a dispersive angle θ≅0.2 radians, and fixed mirror inclination angles of α=50° and β=40°, the fixed mirror sizes are preferably $d_{326}$≅100 µm and $d_{328}$≅200 µm.

Commercially available MEMS micromirror arrays (e.g. from Texas Instruments) are capable of deflecting on the order of δ=±10°. Such MEMS micromirror arrays may be made by known techniques, such as by forming structures micromachined on the surface of a silicon chip. Such micromirrors are attached to pivot structures also micromachined on the surface of the chip. In some implementations, the micromirrors are selectably tilted about a suitably oriented axis using electrostatic attraction.

III. Path-length Equalization

There are at least three criteria that affect reintegration of optical signals at the output ports: (1) whether the optical signal reaches the output port at an angle within the acceptance angle; (2) whether the center lines of the beam of the optical signal and the core of the output port are coordinated; and (3) whether the diameters of the beam of the optical signal and the core of the output port are coordinated. In accordance with these criteria, reintergration of the optical signals is facilitated where the total path length for each of the optical paths 332 and 342 is substantially equal so that beams are focused within their confocal zones.

One such method for equalizing the path lengths is to stagger the optical fibers leading to the input and/or output ports so that the ends of the ports do not necessarily lie in a common plane. Such a method produces the desired equalization and is described in the concurrently filed and commonly assigned application entitled "OPTICAL WAVELENGTH ROUTING ELEMENT WITH STAGGERED FIBERS," having Robert Anderson and Samuel Weaver as inventors, which has been herein incorporated by reference for all purposes. As shown in FIG. 3, the path lengths are equalized most generally by including a stagger of the input port 302 relative to both output ports 306 and 308. In certain embodiments, the separation between the various ports may be equalized, in addition to equalizing path lengths between them through the optical arrangement, by using a suitable stagger length.

Figure 4:
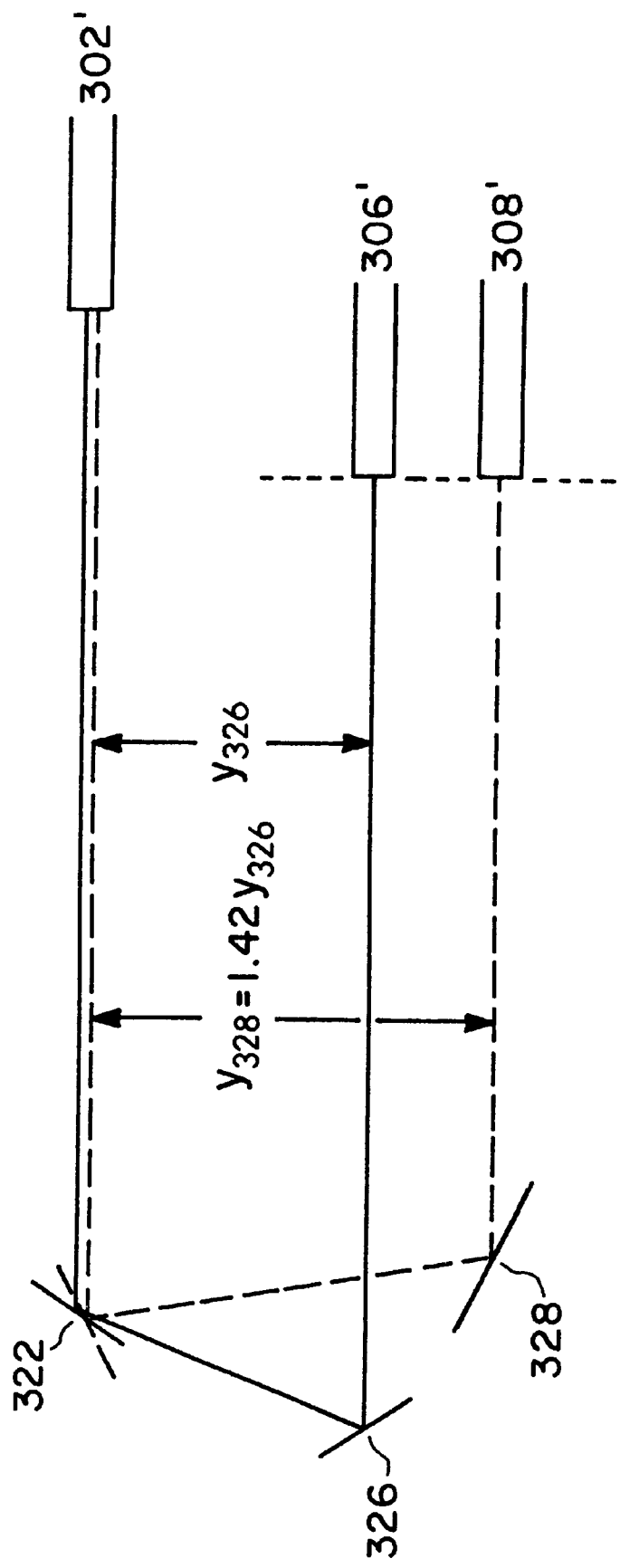
FIG. 4 shows an embodiment of the invention in which both of the output ports lie in a common plane.

In other embodiments, the separation between the ports may be unequal, permitting, for example, the output ports to lie in the same plane. Such an embodiment is illustrated in FIG. 4, where the input port 302' and the output ports 306' and 308' are denoted with primes to distinguish the arrangement shown in FIG. 3. For the 1×2 switch, the required separation between the output ports relative to their separation from the output port is easily calculated. The path-length difference between paths 332 and 342 is given by $$\Delta l = \frac{y_{328}(1-\cos2\beta)}{\sin2\beta} - \frac{y_{326}(1-\cos2\alpha)}{\sin2\alpha}.$$

With the exemplary numerical values used earlier, for ports equally spaced in a direction orthogonal to the propagation directions, $y_{328}$=2$y_{326}$=500 µm, α=50°, and β=40°, the path length difference would be Δl=122 µm. This difference is eliminated and the path length equalized by spacing the ports nonuniformly in the direction orthogonal to the propagation directions. Specifically, the ports are positioned relative to each other such that the path-length difference Δl vanishes:

$$y_{328} = \frac{1-\cos2\alpha\sin2\beta}{1-\cos2\beta\sin2\alpha}y_{326}.$$

In certain embodiments, the inclination angles of the fixed mirrors 326 and 328 are complementary, α+β=90°, yielding the simplified result $$y_{328} = \frac{1-\cos2\alpha}{1+\cos2\alpha}y_{326}.$$

Thus, for α=50°, $y_{328}$=1.42$y_{326}$. This embodiment corresponds to the configuration shown in FIG. 4 with the second fixed mirror 328 moved vertically closer to the first fixed mirror 326. Given the standard telecommunications diameter for optical fibers of 250 µm, this condition may be met by (1) increasing $y_{326}$, the separation between input port 302 and output port 306, above 250 µm or-by (2) decreasing $y_{328}$-$y_{326}$, the separation between output ports 306 and 308, to less than 250 µm. In the first approach, the separation between output ports 306 and 308 may, for example, be fixed at 250 µm so that $y_{326}$=600 µm. In the second approach, the output optical fibers may be brought sufficiently close together by flattening the fibers, for example by removing the polymer layer and shaving an underlying cladding layer.

Having described several embodiments, it will be recognized by those of skill in the art that various modifications, alternative constructions, and equivalents may be used without departing from the spirit of the invention. For example, it will readily be recognized by those of skill in the art that the number of output ports and MEMS micromirror positions may be increased to N, thereby providing a 1×N switch. In such embodiments, the staggered-fiber and fixed-mirror positioning principles may readily be applied to equalize path lengths to the various output fibers. Accordingly, the above description should not be taken as limiting the scope of the invention, which is defined by the following claims.

What is claimed is:

1. An optical routing apparatus for directing an optical signal, the optical routing apparatus comprising:
    (a) an input port configured to provide the optical signal along an initial straight incident path;
    (b) a plurality of output ports, each configured to receive the optical signal; and
    (c) an optical switching arrangement adapted to shift among a plurality of distinct optical configurations, the optical switching arrangement including:
        (i) a plurality of fixed mirrors, each positioned at a particular angle with respect to the initial straight incident path and each of which is associated with one of the plurality of output ports; and
        (ii) a rotatable mirror configured to rotate to a plurality of distinct positions, each of which defines an approximately right included angle with a particular fixed mirror, such that the optical signal may be reflected off the rotatable mirror and such particular fixed mirror to direct the optical signal to the output port associated with such particular fixed mirror.

2. The optical routing apparatus according to claim 1 wherein each optical path defined by the optical switching arrangement from the input port to one of the output ports is of approximately the same length.

3. The optical routing apparatus according to claim 2 wherein each of such fixed mirrors is positioned to achieve equalization of optical path length.

4. The optical routing apparatus according to claim 1 wherein each fixed mirror has a spatial extent proportional to its perpendicular distance from the initial straight incident path.

5. The optical routing apparatus according to claim 1 wherein the number of output ports and the number of fixed mirrors is two.

6. The optical routing, apparatus according to claim 5 wherein the included angles defined by the rotatable mirror and each of the fixed mirrors are complementary.

7. The optical routing apparatus according to claim 6 wherein one of the fixed mirrors has a perpendicular separation from the initial straight incident path that is approximately 1.42 times a perpendicular separation of the other fixed mirror from the initial straight incident path.

8. A method for directing an optical signal, the method comprising:
(a) providing the optical signal from an input port along an initial straight incident path; and
(b) operating an optical switching arrangement to direct the optical signal along one of a plurality of optical paths, each such optical path including:
 (i) a reflection off a rotatable mirror configured to rotate to a plurality of distinct positions, each of which defines an approximately right included angle with a particular one of a plurality of fixed mirrors, each such fixed mirror being positioned at a particular angle with respect to the initial straight incident path and being associated with an output port; and
 (ii) a reflection off that particular fixed mirror to its associated output port.

9. The method according to claim 8 wherein each optical path from the input port to an output port is of approximately the same length.

10. The method according to claim 9 wherein each of such fixed mirrors is positioned to achieve equalization of path length.

11. The method according to claim 8 wherein each fixed mirror has a spatial extent proportional to its distance from the initial straight incident path.

12. The method according to claim 8 wherein the number of fixed mirrors is two.

13. The method according to claim 12 wherein the included angles defined by the rotatable mirror and each of the fixed mirrors are complementary.

14. The method according to claim 13 wherein one of the fixed mirrors has a perpendicular separation from the initial straight incident path that is approximately 1.42 times a perpendicular separation of the other fixed mirror from the initial straight incident path.

15. The method according to claim 8 wherein operating the optical switching arrangement comprises rotating the rotatable mirror to one of such distinct positions.

16. A wavelength router for receiving, at an input port, light having a plurality of spectral bands and directing subsets of the spectral bands to respective ones of a plurality of output ports, the wavelength router comprising:
(a) a free-space optical train disposed between the input port and the output ports providing optical paths for routing the spectral bands, the optical train including a dispersive element disposed to intercept light traveling from the input port; and
(b) an array of optical routing mechanisms, each configured to direct a given spectral band, and each such optical routing mechanism including:
 (i) a plurality of fixed mirrors; and
 (ii) a rotatable mirror configured to rotate to a plurality of distinct positions, each of which defines an approximately right included angle with a particular fixed mirror,
  wherein each given spectral band is directed to different output ports depending on the position of the rotatable mirror, each such given spectral band following an optical path that includes a reflection off one of the fixed mirrors and a reflection off the rotatable mirror.

17. The wavelength router according to claim 16 wherein the dispersive element is a grating.

18. The wavelength router according to claim 17 wherein the optical train includes focussing power incorporated into the grating.

19. The wavelength router according to claim 17 wherein the grating is a reflective grating.

20. The wavelength router according to claim 17 wherein the grating is a transmissive grating.

21. The wavelength router according to claim 16 wherein each optical path from the input port to an output port is approximately the same length.

22. The wavelength router according to claim 21 wherein the output ports are staggered with respect to one another to achieve equalization of path length.

23. The wavelength router according to claim 21 wherein each of such fixed mirrors is positioned to achieve equalization of path length.

* * * * *